3,234,106
SOLUBLE, PURIFIED PROFIBRINOLYSIN AND FIBRINOLYSIN AND METHOD OF PRODUCING SAME

John H. Hink, Jr., Berkeley, and John K. McDonald, Santa Clara, Calif., assignors to Cutter Laboratories, Inc., Berkeley, Calif., a corporation of Delaware
No Drawing. Filed Dec. 3, 1962, Ser. No. 241,529
5 Claims. (Cl. 195—62)

This invention relates to and in general has for its object the provision of highly purified human profibrinolysin and fibrinolysin which are soluble, at neutrality in physiological aqueous solutions containing ionizable salts, and to the provision of a method for producing the same.

For over 15 years, scientists throughout the world have separated profibrinolysin from the blood of humans (and other animals). We have used the methods of many of these scientists, as well as our own procedures, to obtain profibrinolysin of various degrees of purity. All of the products resulting from these purifications have been essentially insoluble in water at pH values between 5 and 7.4, especially in the presence of electrolytes. This insolubility has been recognized by the foremost investigators of the profibrinolysin field as a characteristic of purified plasma profibrinolysin. Although this lack of solubility is incongruous with the fact that profibrinolysin is soluble in native blood or plasma, this paradoxical situation has heretobefore been explained by the postulate that profibrinolysin is soluble in its natural or native environment only because of protein-protein interactions. This same postulate suggests that purified profibrinolysin, free o fthe other plasma proteins, should be insoluble at physiological pH and salt concentration. As all of the materials containing profibrinolytic activity isolated prior to this invention have indeed been insoluble in neutral aqueous solutions, this postulate has met general acceptance.

Our discovery of a purification method which yields a highly purified profibrinolysin having a complete solubility under physiological conditions disputes this postulate. We have shown that profibrinolysin in its highly purified form is soluble in neutral aqueous electrolyte-containing solutions, which is typical of euglobulins, when said profibrinolysin has been isolated by the purification process described in this specification. We have shown that this euglobulin profibrinolysin when treated with mild acid (e.g., in aqueous solutions at pH values below about 5) is easily converted to the pseudogolbulin type having the solubility characteristics attributed to all purified profibrinolysin isolated prior to our invention. We have found that as the hydrogen-ion concentration used in this treatment is increased to below pH 5, the rapidity and completeness of the conversion of our euglobulin profibrinolysin to the pseudoglobulin profibrinolysin is accelerated. It is our contention that up to the present time other workers have failed to isolate profibrinolysin in its euglobulin form, but have instead produced and ultimately purified an unnatural pseudoglobulin substance, having profibrinolytic activity, through the use of mild to strong acidic conditions. These conditions have not only resulted in the modification of euglobulin profibrinolysin, but also have been instrumental in bringing about an easy and convenient purification method for a substance having profibrinolytic activity. It is probable that without effecting this change, these investigators could not have obtained the profibrinolytic activity and purity claimed.

A review and study of the procedures used to isolate profibrinolytic activity from blood or plasma prior to this invention supports our contention. Incorporated as an integral part in the purification procedures described to date is a manipulation of the plasma protein in aqueous acid. The majority of these procedures involved the use of pH values below 3, in order to effect significant purification.

Listed below are references to those processing procedures which are known to us, with the minimum pH value used in each:

Reference to process | Minimum in pH value
--- | ---
Remmert, L. F., and Cohen, P. P., J. of Biol. Chem. 181, 431 (1949). Partial Purification and Propties of a Proteolytic Enzyme of Human Serum | 3.75
Christensen, L. R., Smith, H. D., Jr., Proc. Soc. Expt. Biol. and Med. 74, 840 (1950). Plasminogen Purification by Acid Extraction | 2.0
Clifton, E. E., and Cannamela, D., J. Appl. Physiol. 6, 42 (1950). Fibrinolytic and Proteolytic activity of a Human "Plasminiogen" Prepared From Fraction III of Human Plasma | 2.5
Kline, D. L., J. Biol. Chem. 204, 949 (1953). Purification and Crystallization of Plasminogen | 2.0
Lassen, M., Acta Chem. Scand. 13, 1 (1959). Evidence of the Different Nature of Human Plasminogen and Proactivator | 2.0
Hagan, J. J., Ablondi, F. F., De Renzo, E. C., Jr., Biol. Chem. 235, 1005 (1960). Purification and Biochemical Properties of Human Plasminogen | 2.0
Roberts, P. S., J. Biol. Chem. 235, 2262 (1960). The Esteraes Activities of Human Plasmin During Purification and Subsequent Activation by Streptokinase or Glycerol | 2.0
Sgouris, J. T., Inman, J. K., McCall, K. B., Hyndman, L. A., and Anderson, H. D. The Preparation of Human Fibrinolysin (Plasmin), Vox Sang. 5, 357 (1960) | 2.0
Wallen, Per, and Bergstrom, K., Acta Chem. Scand. 14, 217 (1960). Purification of Human Plasminogen on DEAE Cellulose | 3.5
Kline, D. L., and Fishman, J. B., J. Biol. Chem. 236, 3232 (1961). Improved Procedure for the Isolation of Human Plasminogen | 2.0
Ronwin, E., Canadian J. of Biochem. and Physiol. 40, 49 (1962). Properties of Human Plasmin | 2.7
U.S. Patent No. 2,923,665, Hagan, Clarke, and Ablondi | 3
U.S. Patent No. 2,922,745, Singher and Dressler | 2

Profibrinolysin resulting from the use of any of the above processes is insoluble at neutrality, especially in the presence of electrolytes, yet profibrinolysin prepared according to our technique is soluble at neutrality in the presence of electrolytes. For purposes of illustrating the technique by which our process can be carried out, the following example is set forth in detail:

EXAMPLE NO. 1

Purification of profibrinolysin

When purity of profibrinolysin is a prime consideration, the starting material for the preparation of such profibrinolysin is Cohn fraction III–2,3, as prepared by Method 9, Oncley et al., J. Am. Chem. Soc. 71, 541 (1949). The steps for the subfractionation of fraction III–2,3 follow. If purity of profibrinolysin is of secondary importance and yield of profibrinolysin is of primary importance, the subfractionation of fraction III–2,3 to fraction III–4 can be dispensed with. If Step No. 1 (subfractionation of fractions III–2,3 to III–4) is not carried out, Step No. 2 (adsorption of profibrinolysin on calcium phosphate) can be carried out directly on fraction III–2,3, using the conditions described for fraction III–4. If the purity of profibrinolysin to be recovered is of even less importance, the fraction III of Cohn et al., J. Am. Chem. Soc. 68, 459 (1946), can be substituted for fraction III-4 in the following Step No. 2. If a rapid method for obtaining profibrinolysin of low but substantial purity is desired, human sera diluted one part with nine parts of 0.3 M glycine can be substituted for the fraction III-4 suspension of Step No. 2 which follows:

*Step No. 1.*—Suspend each kg. of the III-2,3 paste in 20 liters of 0.2 M sodium acetate at 4° C. Adjust the pH to 6.2 with HCl and stir at 4° C. for at least three hours. Centrifuge the suspension and collect the precipitate, which we designate as fraction III-4.

*Step No. 2.*—Suspend each kg. of the fraction III-4 paste in 40 liters of 0.3 M glycine at 4° C. and adjust the pH thereof to 8.0 with NaOH and stir at 4° C. for at least two hours. Add finely divided tricalcium phosphate (as an aqueous suspension at pH 8.0, 10 liters/kg. of fraction III-4) in an amount equivalent to 22 gm. tricalcium phosphate/liter of suspension (about 5 gm. tricalcium phosphate/gm. of protein) and stir at 4° C. for at least three hours. Centrifuge the suspension and collect the precipitate, which consists of profibrinolysin adsorbed onto tricalcium phosphate. Suspend the precipitate in aqueous 0.2 M 6-amino hexanoic acid containing 0.2 M chloride at 4° C. and pH 9.0 using six liters of suspension media/kg. of III-4 paste. Stir the suspension at 4° C. for at least three hours. Centrifuge the suspension which remains and discard the precipitate. Add 470 gms. of solid ammonium sulfate to each liter of supernatant, stir and allow to stand at +4° for at least three hours. Centrifuge the suspension to recover the precipitate of native profibrinolysin.

*Step No. 3.*—Suspend the profibrinolysin precipitate, which contains occluded ammonium sulfate, in a minimum volume of distilled water. Dialyze the suspension against 0.1 M ammonium carbonate at 4° C. until the imperviate is free of sulfate ion. Freeze the imperviate and lyophilize (freeze dry). The final dry product is highly purified euglobulin profibrinolysin essentially free of salt.

All conditions cited in the above three-step process are believed to be optimum conditions designed to result in maximum yield and purity of euglobulin profibrinolysin. By following the process as stated in Example No. 1, we have repeatedly obtained profibrinolysin having euglobulin solubility characteristics with a specific activity of at least 300 Roswell Park Memorial Institute units of profibrinolytic activity (110 casein units) per mg. of Kjeldahl nitrogen. These exact conditions can be varied somewhat and the effect on the final yield and purity will be only a matter of degree.

For the adsorption on tricalcium phosphate, at pH values below 7, inactive plasma proteins are adsorbed to a much greater degree than above 7. Consequently, the selectivity of profibrinolysin adsorption at pH values near 8 is lost and less purification results. With increasing pH for the adsorption step, the adsorption is less and is so poor at pH 9.2 that the over-all yield becomes uneconomical. The adsorption step can be carried out in the absence of the amino acid, glycine, but if done so, it results in a less pure profibrinolysin product due to adsorption and consequent elution of inactive plasma protein during the procedure.

Although our example shows 6-amino hexanoic acid as our choice of eluting agent, lysine or arginine and, to a somewhat lesser degree, 5-amino pentanoic acid, cysteine and glutathione will be suitable. The concentration of eluting agent can be reduced below that specified, but the yield of profibrinolysin is also reduced. Concentrations of eluting agent greater than specified are wasteful and can bring about reduced purity of the final product. The presence of sodium chloride or other electrolyte during elution is required for maximum profibrinolysin purification as well as for simplification of processing steps. Sodium chloride or other electrolyte depresses the solubility of inert plasma proteins during the elution step. Although concentrations below 0.2 M can be used, these lower concentrations will result in a less pure final product. Greater concentrations than specified will tend to reduce the solubility of profibrinolysin during elution, thus resulting in lower yields of final product. The presence of electrolyte during and after elution also prevents the formation of calcium phosphate colloidal suspensions through its ionic effects, thus reducing the difficulty with which this calcium phosphate is removed from the eluate. With decreasing pH during elution there is a loss of profibrinolysin yield until at pH values between 5.5 and 6.2, most of the profibrinolysin remains adsorbed on the tricalcium phosphate. As the pH of the eluting step increases, more and more plasma protein impurity is released from the calcium phosphate, thus reducing the purity of the final product.

The ammonium sulfate concentration used to precipitate this euglobulin profibrinolysin from its eluate is also optimal; lower concentrations will result in lower yields, while greater concentrations are not required for complete precipitation of the protein and are therefore wasteful. We have used sodium chloride, sodium citrate, acetone, and ether to effect this precipitation and although such precipitating agents work to a degree, their use results in a much lower yield of usable final product.

Step No. 3 of our process is used as a means for the removal of contaminating salts from our euglobulin profibrinolysin. Occluded ammonium sulfate must be removed because it is present to a different degree in different preparations when only small processing changes are made, and consequently might influence greatly the solubility of the final product. Dialysis is a conventional means for salt removal, but dialysis against water would result in removal of all electrolytes and consequently the precipitation of our euglobulin profibrinolysin. As electrolytes are required to retain our profibrinolysin in solution and yet cause somewhat of a problem during drying, we have resorted to the seldom-used ammonium carbonate dialysis solution to accomplish a desirable end product. After removal of undesirable salts during dialysis, we can remove the ammonium carbonate, because of its high vapor pressure, during conventional lyophilization. Thus, our final product is composed of dry protein only. This protein can be dissolved in whatever physiological diluent will best meet the requirements.

By selective modification of the conditions described for each step of Example No. 1 to increase the purity of the resultant euglobulin profibrinolysin at the expense of yield, we have prepared dried powders having a specific activity of 400 Roswell Park Memorial Institute units of profibrinolytic activity (140 casein units) per mg. of Kjeldahl nitrogen.

To show that investigators heretofore have isolated not the euglobulin profibrinolysin resulting from our invention but, in fact, a modified pseudoglobulin profibrinolysin containing profibrinolytic activity, we have converted profibrinolysin (prepared by the process described in Example No. 1) having euglobulin properties to the modified or pseudoglobulin form by employing the acidic conditions used without exception by previous investigators. This conversion can be best described in the following example:

EXAMPLE NO. 2

*Conversion of euglobulin profibrinolysin by acid treatment*

A sample of euglobulin profibrinolysin prepared from human plasma by our process described in Example No. 1 was suspended in distilled water and found to be essentially insoluble. Another sample was reconstituted with physiological (0.15 M) sodium chloride solution and found to be completely soluble. The solubility characteristics of this untreated protein show it to be of the protein class known as euglobulin (true globulin).

A third sample of the same euglobulin profibrinolysin was suspended in distilled water and adjusted to pH 4 with mineral acid. To one aliquot of this acidic solution was added sodium chloride to a concentration of 0.15 M, whereupon a protein precipitate formed. Another aliquot of the acidic solution was brought to pH 7.4, whereupon the majority of the protein was found to be insoluble.

Yet another aliquot of the acidic solution was brought to pH 8.2. The slightly alkaline protein solution was then brought to 0.15 M sodium chloride to form a precipitate of protein. The solubility characteristics of this acid-treated protein show it to be of the protein class known as pseudoglobulin (false globulin).

Our experimental evidence confirms our contention that even very mild acid treatment of euglobulin profibrinolysin causes a change to take place in the profibrinolysin molecule, this change being most obvious when solubility characteristics of the euglobulin and modified pseudoglobulin form are compared.

However, this is not the only manner by which this change can be demonstrated. Profibrinolysin is known to be a proenzyme or inactive precursor to the biologically active enzyme fibrinolysin. In the simplest possible terms, the naturally occurring profibrinolysin is converted to active fibrinolysin by the action of certain activators present in human tissue. In vitro, human profibrinolysin can be converted to fibrinolysin by the action of such activators as urokinase, trypsin, streptokinase, or staphylokinase under suitable conditions of pH, temperature, and ionic strength. Heretofore, fibrinolysin prepared from profibrinolysin which had been isolated by procedures involving acidic treatment has been insoluble at neutrality, especially in the presence of electrolytes. Thus it can be said that fibrinolysin known up to the time our invention has had the solubility characteristics of a pseudoglobulin. Fibrinolysin prepared by activation of the pseudoglobulin profibrinolysin substance made in our Example No. 2 has these same pseudoglobulin solubility characteristics. Yet, fibrinolysin prepared from the euglobulin profibrinolysin made in our Example No. 1 has euglobulin solubility characteristics, being completely soluble in physiological diluents at neutrality but insoluble in distilled water.

As an example of the preparation of fibrinolysin from our euglobulin profibrinolysin, we cite the following:

EXAMPLE NO. 3

*Activation of euglobulin profibrinolysin to prepare fibrinolysin*

The starting material for the preparation of fibrinolysin having euglobulin solubility characteristics is euglobulin profibrinolysin prepared according to our Example No. 1.

*Step No. 1.*—Dissolve euglobulin profibrinolysin in physiological diluent (e.g., 0.15 M sodium chloride, 0.05 M sodium phosphate buffer, 0.05 M ammonium carbonate) to obtain a solution containing from 200 to 1000 Roswell Park Memorial Institute units of profibrinolytic activity (70 to 400 casein units) at 25° C. Adjust to pH 8 with dilute sodium hydroxide as required.

*Step No. 2.*—Add 0.1 to 0.5 Plough units of urokinase per RPMI unit of profibrinolytic activity and stir the solution gently for 10 to 20 minutes.

*Step No. 3.*—Cool the resultant solution of fibrinolysin to 4° C. to prevent autoproteolytic destruction of the enzyme produced.

*Step No. 4.*—While keeping the solution of fibrinolysin at 4° C., dispense aliquots into appropriate containers and freeze-dry the aliquots.

The conditions for the activation of profibrinolysin to fibrinolysin as cited in Example No. 3, are suitable only when the profibrinolysin used is of the euglobulin type. If these conditions were used with pseudoglobulin profibrinolysin prepared by any of the procedures referred to early in this specification or by the method described in Example No. 2, little or no fibrinolysin would be formed.

For pseudoglobulin profibrinolysin to be optimally activated to fibrinolysin, an electrolyte-free diluent would be required to solubilize the pseudoglobulin profibrinolysin. Furthermore, a considerably higher ratio of urokinase to profibrinolytic activity (e.g., about 3 Plough units of urokinase per RPMI unit) would be required to fully activate the profibrinolysin to fibrinolysin in 10 to 20 minutes.

Of course, the need for an environment containing a low concentration of electrolyte when solubilizing pseudoglobulin profibrinolysin is obvious. By our own definition and description, we have shown that electrolytes reduce the solubility of pseudoglobulin profibrinolysin and fibrinolysin (yet enhance the solubility of euglobulin profibrinolysin and fibrinolysin). The requirement for much greater quantities of urokinase per unit of pseudoglobulin profibrinolysin than for a similar quantity of euglobulin profibrinolysin is less easily explained. However, we think that this need for excess urokinase demonstrates again that pseudoglobulin profibrinolysin is a modified form. Not only does the mild acid treatment producing pseudoglobulin profibrinolysin from euglobulin profibrinolysin produce extensive changes in solubility characteristics, but this same treatment must block urokinase receptor sites on the profibrinolysin molecule so that 10 to 30 times the urokinase needed for euglobulin profibrinolysin is needed to activate an equivalent amount of pseudoglobulin profibrinolysin.

Furthermore, we have demonstrated that our euglobulin profibrinolysin can be activated to euglobulin fibrinolysin having greater specific activity than the pseudoglobulin profibrinolysin made from the same euglobulin profibrinolysin by use of the conditions cited in Example No. 2. Even though optimal conditions for the activation of the distinctly different profibrinolysins are used, we have been unable to achieve a pseudoglobulin fibrinolysin specific activity equivalent to that obtained from the euglobulin profibrinolysin.

We have repeatedly obtained euglobulin fibrinolysin having a specific activity of at least 300 Roswell Park Memorial Institute units of fibrinolytic activity (110 casein units) per mg. of Kjeldahl nitrogen. The lower specific activity found for pseudoglobulin profibrinolysins further supports our contention that the change of euglobulin profibrinolysin brought about by acidic treatment of said profibrinolysin is detrimental and results in lower biological activity.

Profibrinolysin prepared according to our invention, without exposure to conditions of acidity or alkalinity outside of the pH range 6.5 to 9.5, has a solubility in physiological diluent greatly in excess of previously known profibrinolysins. Profibrinolysin prepared according to our invention can easily be prepared as a 10% protein solution in 0.15 to 0.3 M sodium chloride at pH 7.4, while it is unlikely that profibrinolysins of similar purity prepared by methods in existence prior to our invention could be solubilized to yield greater than 0.05 per cent protein solution in the same diluent.

Fibrinolysin made by activation of the profibrinolysin prepared according to our invention, without exposure to conditions of acidity or alkalinity outside of the pH range 6.5 to 9.5, has a solubility in physiological diluent which is greatly in excess of presently available fibrinolysins. Fibrinolysin prepared from our profibrinolysin is soluble in sodium chloride, sodium phosphate, or other salt solutions containing an ionic strength of 0.1 to 0.4 and pH values of 7 to 8 and higher. Those fibrinolysins which were previously available are essentially insoluble in aqueous solutions at neutral pH values and the users of such fibrinolysins are cautioned against the use of solutions containing electrolytes when dissolving such fibrinolysins. Instead of physiological diluents, solutions containing dextrose or other osmotically equivalent sugar or sugar alcohol must be used to dilute the presently available fibrinolysins for intravenous use to prevent erythrocyte hemolysis during the infusion. As fibrinolysin is often used to effect clot lysis in diabetics (diabetics are particularly susceptible to vascular clot formation and consequently often require fibrinolytic therapy), the inclusion of sugar as a diluent for fibrinolysin creates extra problems for the clinician. Fibrinolysin made from out profibrinolysin and dissolved in a physiological saline diluent circumvents this clinical problem.

We claim:

1. The process of purifying human profibrinolysin in a source selected from the group consisting of a Cohn blood fraction III-2,3, a Cohn blood fraction III, and human sera diluted 9:1 with 0.3 M glycine comprising: adsorbing profibrinolysin in said source onto tricalcium phosphate at a pH value between 7.0 and 9.2, suspending the resulting insoluble mass at a pH value above 6.5 in an aqueous solution containing a suitable epsilon amino fatty acid of sufficient concentration to elute the profibrinolysin therefrom, and then completing the purification of the profibrinolysin by dialysis and lyophilization.

2. The process of purifying human profibrinolysin in a Cohn blood fraction III-4 comprising: adsorbing the profibrinolysin in said fraction onto tricalcium phosphate at a pH value between 7.0 and 9.2, suspending the resulting insoluble mass at a pH value between 7 and 9.5 in an epsilon amino caproic acid-sodium chloride eluting solution of sufficient concentration to elute the profibrinolysin therefrom, and then completing the purification of the profibrinolysin by dialysis and lyophilization.

3. A purified human euglobulin profibrinolysin soluble at neutrality in the presence of electrolytes yet insoluble in distilled water.

4. The process of converting profibrinolysin obtained by the process set forth in claim 1, above, to a substance containing profibrinolytic activity yet insoluble at neutrality by treatment with acid within the range of pH values 1 to 4.

5. A purified human euglobulin fibrinolysin, soluble at neutrality in the presence of electrolytes, yet insoluble in distilled water.

References Cited by the Examiner

UNITED STATES PATENTS 3,066,079  11/1962  Hagan et al. _____ 195—66
3,150,060  9/1964  Sanders et al. _____ 195—66

OTHER REFERENCES

Ion Exchangers in Organic and Biochemistry, Interscience Pub. Inc., 1957, pages 318 to 335.

A. LOUIS MONACELL, *Primary Examiner.*